H. YSSKIN.
WHEEL.
APPLICATION FILED OCT. 3, 1919.

1,394,461.

Patented Oct. 18, 1921.

INVENTOR
Herman Ysskin,
BY
Wm. T. H. Camfield.
ATTORNEY.

UNITED STATES PATENT OFFICE.

HERMAN YSSKIN, OF NEWARK, NEW JERSEY.

WHEEL.

1,394,461. Specification of Letters Patent. Patented Oct. 18, 1921.

Application filed October 3, 1919. Serial No. 328,160.

*To all whom it may concern:*

Be it known that I, HERMAN YSSKIN, a citizen of the United States, and a resident of Newark, county of Essex, and State of New Jersey, have invented certain new and useful Improvements in Wheels, of which the following is a specification.

This invention relates to an improved wheel of the type that is not injured by puncture, as the resiliency of the wheel is due primarily to the structure of the wheel itself and is not dependent on inflation.

The wheel herein described is economical, since it is adapted to be used a long while without replacement of the tire or any of the parts thereof, and it is adapted to cheap maintenance since it is easily repaired.

The wheel described herein is more particularly adapted for trucks, especially light trucks and delivery wagons, and the illustration shows this type, although the wheel can be used on passenger cars.

Figure 1:
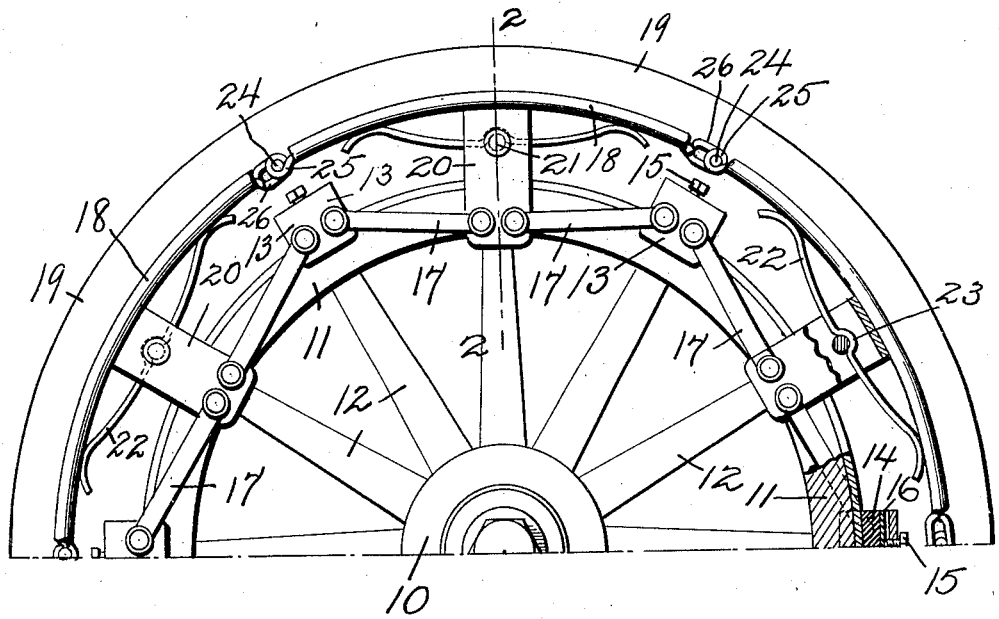
Figure 2:
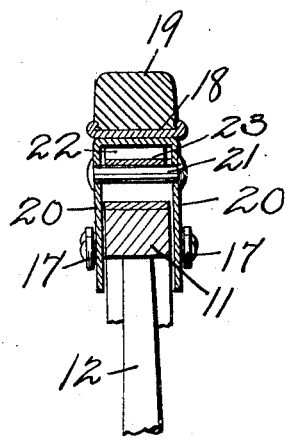

The invention is illustrated in the accompanying drawing, in which Figure 1 is a side view of the upper half of a wheel of my improved construction, with portions thereof broken away to more clearly illustrate the construction, and Fig. 2 is a section on line 2—2 in Fig. 1.

The invention comprises what I term in this specification the wheel proper, which is the central or base portion of the wheel, and in the form shown consists of a hub 10 and a felly 11 and having the spokes 12 of the usual type, and bearing on the felly of the wheel proper at separated points are clips, which are substantially U-shaped, and when inverted and placed over the felly of the wheel proper embrace the felly. The clips 13 are thus held against excessive side movement on the felly and can be moved radially, such movement, however, being limited by a suitable yielding means. The yielding means illustrated is a block 14 of rubber or the like, the compressibility of which is adjusted by means of the bolt 15 in each clip, a metal plate 16 being preferably placed so that the bolt bears on it, thus preventing any localized compression of the block 14.

The clips 13 are parts of a flexible circumferential support, which flexible circumferential support can be of various constructions, but in the form shown consists of the links 17, each link being fastened at one end to a clip and at the other end to a part extending inwardly from the rim. In the form shown the rim is sectional, consisting of cradles 18 which support the tire 19 and have parts 20 which extend inwardly and supply the elements to which the links 17 are fastened. The arms 20 extend inward on either side of the felly of the wheel proper and thus prevent lateral motion of the tire relative to the wheel as the cradles are riveted or welded or otherwise secured to the arms. The tire supporting elements bear on the flexible circumferential support so that a limited compression is possible by reason of both the flexibility of the support and the yielding or cushion element under each clip 13.

I brace the arms 20 against separation under strain by passing a bolt 21 through them and suitably heading it or providing nuts at the ends of the bolt to hold the arms 20 in position, the bolt also acting as a support for a brace or truss 22, which is of substantial width and bears at its center 23 on the bolt 21, and at its ends engages the under side of the cradle near its ends to prevent undue strain from breaking the cradle.

The cradles are preferably joined together by a connection which not only aids in supporting the cradles, but provides for a smoother running wheel in that the end of a cradle, engaging the ground, will draw with it the next adjacent cradle to make it substantially tangential to the surface on which the vehicle is rolling as said cradle approaches the surface. In the form shown this connection consists of a pintle or bolt 24 which passes through the knuckles 25 and 26, one of which, as the knuckle 26, can be slotted to permit the required motion of the cradle.

Various modifications can be made in the structure in the way of arrangement of the parts, or their individual construction, without departing from the scope of the invention.

I claim:

1. A wheel comprising a wheel proper, a rim having radially arranged arms extending inwardly alongside the wheel proper, and a flexible circumferential support supported by the wheel proper and connected to the arms.

2. A wheel comprising a wheel proper, a rim extending around and spaced from said wheel proper, a flexible circumferential support supported on the felly of the wheel proper and including arms which are connected to the rim.

3. A wheel comprising a wheel proper, spaced clips on the felly of the wheel proper, yielding elements under the clips, links connected to the clips, cradles with projecting arms between the clips and connected to the links, and a tire on said cradles.

4. A wheel comprising a wheel proper, spaced clips embracing the felly of the wheel proper, cushion elements under the clips, arc-shaped cradles with projecting arms embracing the felly of the wheel proper between the clips, links connecting the arms with the clips, and a tire on the cradles.

5. A wheel comprising a wheel proper, spaced clips embracing the felly of the wheel proper, cushion elements under the clips, arc-shaped cradles with projecting arms embracing the felly of the wheel proper between the clips, links connecting the arms with the clips, a tire on the cradles, and slotted connections between the ends of the cradles.

6. A wheel comprising a wheel proper, spaced clips embracing the felly of the wheel proper, cushion elements under the clips, arc-shaped cradles with projecting arms embracing the felly of the wheel proper between the clips, links connecting the arms with the clips, a tire on the cradles, slotted connections between the ends of the cradles, a bolt in each cradle connecting the arms thereof, and a brace resting on each bolt and bearing on the inner side of the cradle near the ends thereof.

In testimony that I claim the foregoing, I have hereto set my hand, this 19th day of September, 1919.

HERMAN YSSKIN.